(12) United States Patent
Holcomb et al.

(10) Patent No.: US 6,315,224 B1
(45) Date of Patent: Nov. 13, 2001

(54) GRATER AND METHOD OF MAKING A GRATING DEVICE

(75) Inventors: David A. Holcomb, Seattle, WA (US); Ignaz Settele, Epfach (DE)

(73) Assignee: Chef'n Corporation, Seattle, WA (US)

( * ) Notice: Subject to any disclaimer, the term of this patent is extended or adjusted under 35 U.S.C. 154(b) by 0 days.

(21) Appl. No.: 09/483,720

(22) Filed: Jan. 13, 2000

Related U.S. Application Data

(63) Continuation-in-part of application No. 09/277,343, filed on Mar. 26, 1999, now abandoned.

(51) Int. Cl.$^7$ .................................................. A47J 43/25
(52) U.S. Cl. ...................... 241/93; 241/95; 241/273.2; 241/273.3; 241/273.4
(58) Field of Search .................. 241/93, 95, 94, 241/273.1, 273.2, 273.3, 273.4, 168

(56) References Cited

U.S. PATENT DOCUMENTS

| | | |
|---|---|---|
| D. 147,688 | 10/1947 | Schechtel . |
| 230,679 | 4/1880 | Toffler . |
| D. 235,501 | 6/1975 | Mantelet . |
| D. 242,973 | 1/1977 | Daenen . |
| D. 276,202 | 11/1984 | Shun . |
| 855,423 | 5/1907 | Alger . |
| 861,359 * | 7/1907 | Dunlap .................................. 241/95 |
| 1,561,401 | 11/1925 | Bembina . |
| 1,633,700 | 6/1927 | Hawkins . |
| 2,048,750 | 7/1936 | Machotka . |
| 2,173,751 | 9/1939 | Burkhart . |
| 2,220,485 | 11/1940 | Kashew . |
| 2,271,175 | 1/1942 | Mantelet . |
| 2,690,307 | 9/1954 | Mantelet . |
| 2,804,896 | 9/1957 | Silbergerg . |
| 3,581,790 | 6/1971 | Del Conte . |
| 3,589,421 | 6/1971 | Locker . |
| 3,642,045 | 2/1972 | Buvelot . |
| 3,813,775 | 6/1974 | Fitzgerald . |
| 4,037,793 | 7/1977 | Puustinen . |
| 4,185,486 | 1/1980 | van Geffen . |
| 4,572,443 | 2/1986 | Coleman . |
| 5,071,663 | 12/1991 | Dugan . |
| 5,097,758 | 3/1992 | Fresh . |
| 5,146,681 | 9/1992 | Haghkar . |
| 5,148,995 | 9/1992 | Hurst . |
| 5,364,037 | 11/1994 | Bigelow . |
| 5,562,256 | 10/1996 | Wolman et al. . |
| 5,660,341 | 8/1997 | Perkins . |
| 5,702,061 | 12/1997 | Kennedy et al. . |
| 5,803,378 | 9/1998 | Wolters . |

FOREIGN PATENT DOCUMENTS

| | | |
|---|---|---|
| 596405 | 4/1934 | (DE) . |
| 104123 | 2/1917 | (GB) . |
| 488925 | 7/1938 | (GB) . |
| 1463031 | 2/1977 | (GB) . |

\* cited by examiner

*Primary Examiner*—Mark Rosenbaum
(74) *Attorney, Agent, or Firm*—Seed IP Law Group PLLC

(57) ABSTRACT

A cheese grating plate having a plurality of staggered rows of apertures, each aperture formed by fitting an insert into a hole or pushing a member into the hole, the aperture having a sharp raised edge around a substantial portion of at least one end of each aperture. In one embodiment the sharp raised edges being formed by a member pushed into the hole. The height of the sharp raised edges extends out no further than twenty thousands of an inch and preferably only ten thousand of an inch. In one embodiment the member forming the sharp raised edge is tapered, cylindrical and has circumferentially spaced edges. In other embodiments the member is a drill bit, or a tapered member that is rocked in the hole. In other embodiments the insert is pressed into the hole and extends out from the plate to form the raised edge.

24 Claims, 6 Drawing Sheets

GRATER AND METHOD OF MAKING A GRATING DEVICE

CROSS-REFERENCE TO RELATED APPLICATION

This application is a continuation-in-part of application Ser. No. 09/277,343, Filed Mar. 26, 1999, now abandoned entitled IMPROVED GRATER AND METHOD OF MAKING A GRATING DEVICE.

TECHNICAL FIELD

This invention relates to a grating device or grater for grating food products, such as cheese, chocolate, or the like, in which a slug of food can be rubbed across the grating device for shaving the food into fine flakes.

BACKGROUND OF THE INVENTION

The grating device of this invention is made from a plate having apertures with sharp raied edges around the perimeter of the apertures and an important feature of the invention is that the raised edges are sharp but extend out from the surface of the plate only less than twenty thousands of an inch. The apertures can be holes in the plate with raised edges or inserts inserted in holes in the plates.

In contrast to the sharp raised edges of the present invention the prior art grating devices use various different types of perforations for apertures in the grating device for grating the food. U.S. Pat. No. 3,581,790 shows a grating surface in which the grating members are formed by piercing the surface of the plate to create raised points sticking out substantially a considerable distance from the plate.

Another U.S. Pat. No. 2,804,896 shows a grating surface in which the apertures are formed by piercing or pushing out the metal to create sharp cutting edges.

Another U.S. Pat. No. 3,589,421 shows circumferentially spaced spikes molded into the grating surface around the apertures.

Other grating devices form cupped-shaped apertures in the surface of the grater or use flat surfaces without any sharp edges at all.

While all of these prior art grating devices will grate or comminute food products, particularly slugs of cheese, none seems to do it in a manner which nicely shaves the food and does it with a minimum of effort needed by the person who is pushing the food across the grating device.

SUMMARY OF THE INVENTION

It is an object of this invention to provide a grating plate or surface which provides a nice shaving action to produce a flake like shaving but with a minimal amount of effort needed to move the food, particularly a slug or block of cheese or chocolate, across the grating surface.

DETAILED DESCRIPTION OF THE INVENTION

Figure 1:
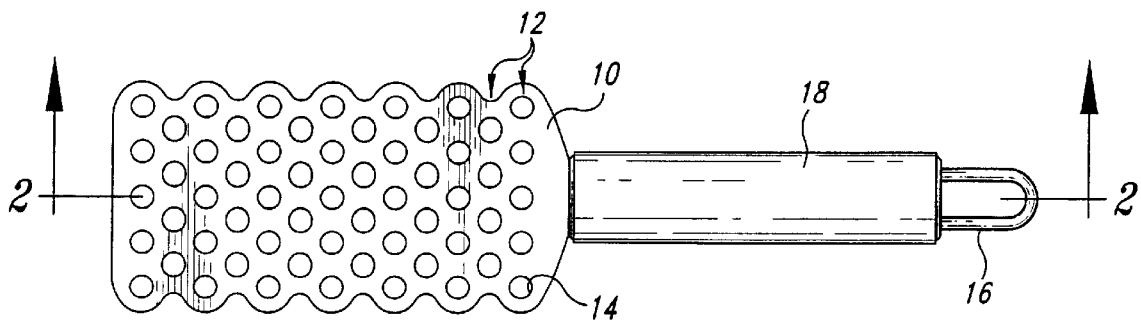
FIG. 1 shows a grater with a handle and embodying the principles of the invention.
Figure 2:
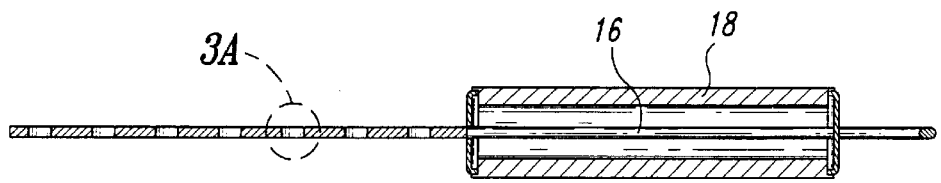
FIG. 2 is a side elevation of the grater shown in FIG. 1.

FIG. 1 shows a plate 10 having a plurality of rows 12 of apertures 14. The rows 12 are staggered so that the apertures are offset from one another between adjacent rows. The plate 10 is preferably made from stainless steel and is approximately about ⅛ inch or less thick. The precise dimensions, of course, can be varied depending upon the type of material and manufacturing techniques.

The plate 10 has an extension 16 to which is rigidly attached a handle 18.

It is a unique feature of this invention that each of the apertures 14 is provided with a sharp raised edge 20 around the perimeter 22 of each opposite ends 24 and 26 of holes in the plate. If desired, the sharp raised edges can be provided only on one side of the plate if the plate is used at all times only by rubbing the food across that one side. Advantageously if the sharp raised edges are on both of the opposite ends 24 and 26 of the apertures then the plate can be turned over and used on either side at the convenience of the user. In addition, the apertures can be in the form of rivets or inserts fitted into the holes, as in FIGS. 13–18. It is understood that apertures can mean a hole with a raised peripheral edge or a hole with an insert or rivet fitted in the hole.

It is also one of the unique features of this invention that the sharp raised edges of the apertures are not simply pierced or molded protrusions or spikes as in the prior art but are formed in a manner that extends the sharp raised edges from the side surface of the plate only a very small amount no greater than about twenty thousands of an inch [0.020 inches]. In one embodiment, the sharp raised edges preferably extend out only ten thousands of an inch [0.010 inches]. This sharpness of the edge but only slight extension out from the surface of the plate provides a shaving action on the food being rubbed across the surface comminuting the food into small flakes as opposed to slices or larger crumpled pieces of food as in other types of graters.

Figure 10A:
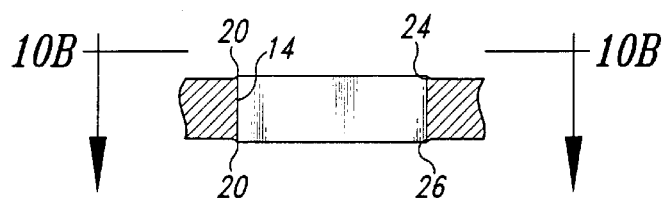
FIGS. 10 and 10B show another embodiment with square apertures.
FIGS. 10C and 10D show a method of making the embodiment of FIGS. 10A and 10B.

In preferred embodiments the sharp raised edges go around the entire perimeter of the ends of the apertures, however, it is possible that the sharp raised edges need only extend along the major portions of the perimeter in the direction confronting the movement of the food over the apertures as shown in FIGS. 10A an 10B. Also see FIGS. 13–15.

Figure 6:
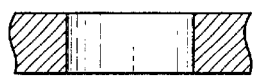
FIGS. 6, 7, and 8 the show method steps of one method involved in forming the desired sharp edge around the perimeter of the apertures of the grating plate.
Figure 7:
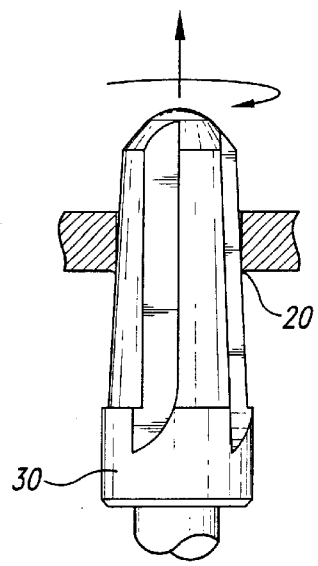
Figure 8:
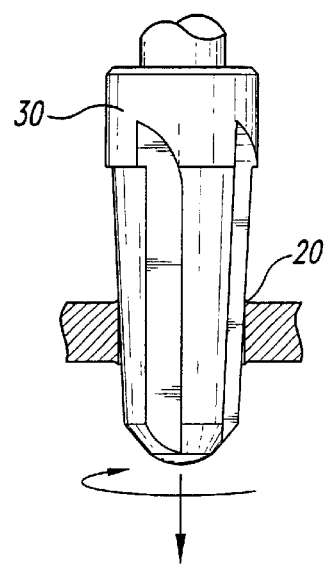

The sharp raised edges are uniquely formed in stainless steel metal by a process, which includes first making holes in the plate as shown in FIG. 6. Then after the holes are made a tapered metal tool or member 30 is pushed into and rotated in the hole from a, first direction to form the raised edge as shown in FIG. 7. If the raised sharp edges are wanted on opposite ends of the holes, then the tool 30 is pushed back through the hole in the opposite direction as shown in FIG. 8.

The tool 30 has circumferentially spaced elongated cutting edges 31 that when pressed against the edge of the end of the hole and rotated forms the sharp raised edge 20.

Figure 3A:
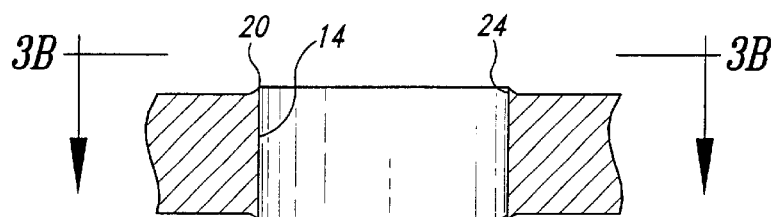
FIG. 3A an enlarged fragmentary detail of one of the apertures of the grater shown in FIG. 1.
Figure 3B:
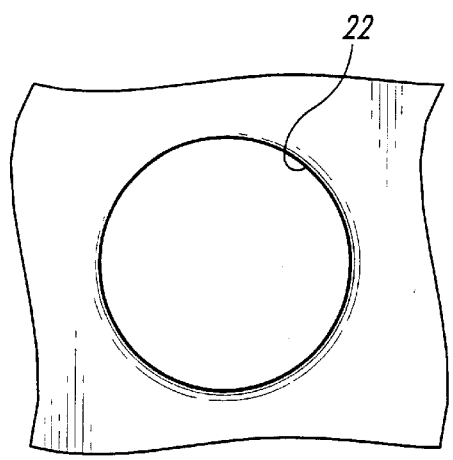
FIG. 3B is a plan view of the detail shown in FIG. 3A.
Figure 4A:
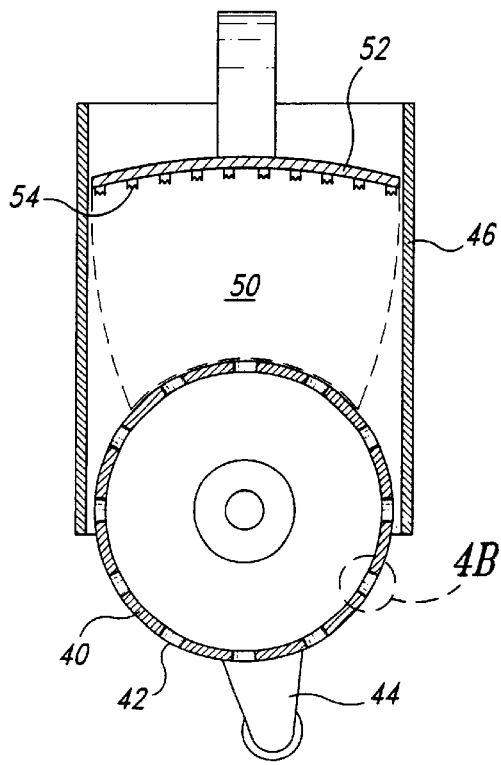
FIG. 4A is another embodiment of a grater showing the principles of the invention.

The unique grating plate of this invention can also be manufactured in curved form as shown in FIG. 4A. In FIG. 4A a curved plate 40 is provided with apertures 42 with the apertures being formed with sharp raised edges in the same manner as in the embodiments of FIGS. 1–3 and FIGS. 6–8 but only on one side. A raised edge is needed only on one side of the plate in this embodiment. The curved plate can be rotated by a handle 44 and a hopper unit 46 placed above the curved plate to support a block of food such as the slug of cheese 50. A pusher 52 having protrusions 54 can be used to push the cheese against the rotating curved grating plate 40 as is well known.

Figure 5A:
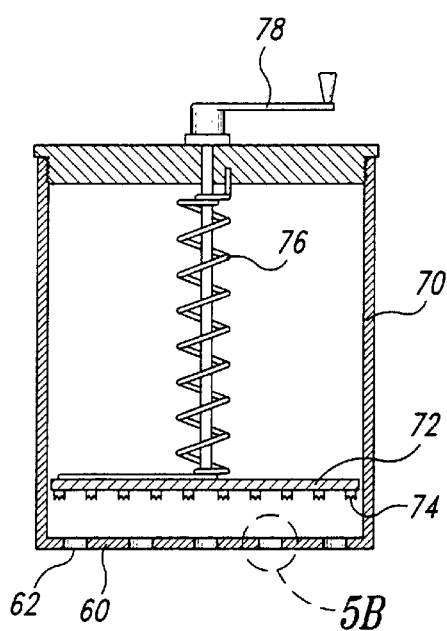
FIG. 5A is still another embodiment showing the principles of the invention.
Figure 5B:
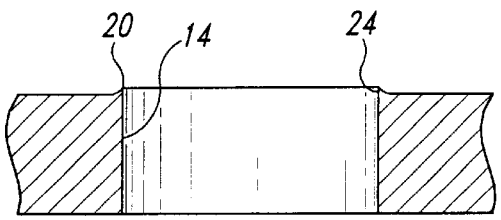
FIG. 5B is an enlarged fragmenting detail of one of the apertures formed in a manner similar to FIG. 3A but with a raised edge on only one side.

FIGS. 5A and 5B show another embodiment in which the plate is in the form of a disc 60 again being provided with apertures 62 having sharp raised edges of the type shown in FIG. 3A but only on one side. In the plate 60 and in the plate 40 the sharp raised edges will be provided only on the upper surface of the plates as this is the only surface that can be contacted by the soft food. Thus, it is unnecessary to have sharp raised edges on opposite ends of the apertures in the plate if only one side of the plate is to be used.

FIG. 5A also shows a conventional cylindrical body 70 with a rotating plate 72 having protrusions 74 for gripping the cheese. The spring 76 holds the plate down while a handle 78 is used for rotating the plate and the rotating the cheese over he grating plate 60.

Figure 4B:
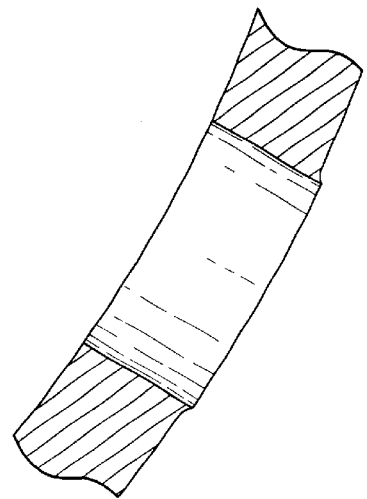
FIG. 4B is an enlarged fragmentary detail of one of the apertures formed in a manner similar to FIG. 3A but with a raised edge on only one side.

The embodiments of FIGS. 4 and 5 are provided to illustrate that the grating plate of this invention with its sharp raised edges around the perimeter of the apertures can be used for any type of grating surface, either static (that is, being held still) or movable and either powered manually or by motor.

Figure 10B:
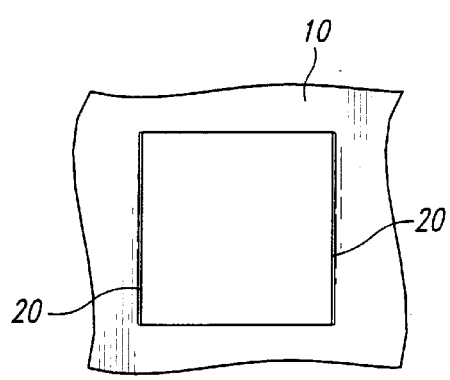
Figure 10C:
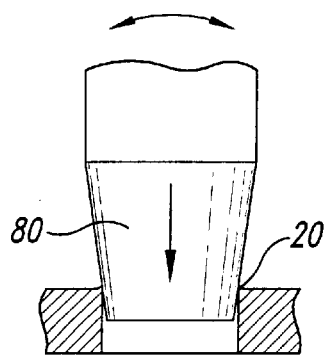
Figure 10D:
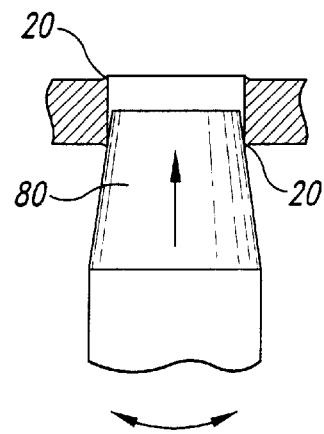
Figure 11:
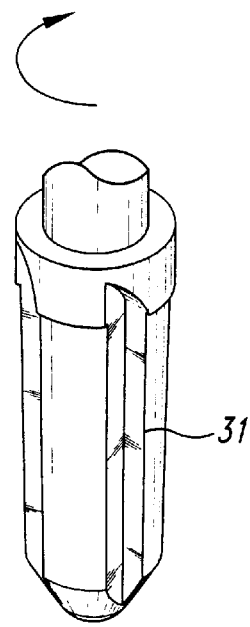
FIG. 11 shows a unique cutting tool for forming the raised edge around the hole in a material like stainless steel.
Figure 12:
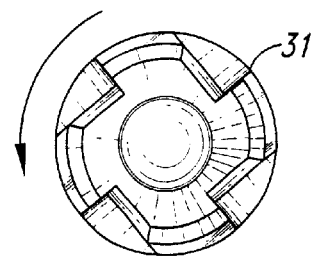
FIG. 12 is a bottom end view of the tool of FIG. 11.

The raised edges do not have to be around the entire periphery of the apertures although this is the preferred manner of forming the apertures. The apertures can be square, triangular, oval, and rectangular or any non-circular shapes can long as the sharp edges of this invention can be made on the ends of the apertures. FIGS. 10A and 10B, for example, show an embodiment that uses a square hole and with the sharp raised edges only on opposite opposed edges in the direction of rubbing of the food across the plate. The sharp raised edges for a square or rectangular hole can be formed by pushing a tapered member 80 into the hole and rocking it back and forth, with the tapered member being tapered only on two opposite opposed sides and not tapered on the other two opposed sides as shown in FIGS. 10C and 10D.

Figure 9:
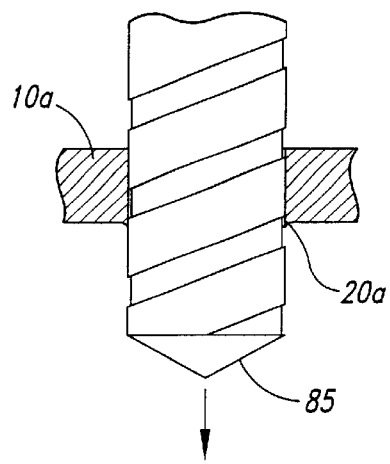
FIG. 9 shows the method steps of another method of forming the desired sharp edges around the perimeter of the apertures on one side only in a soft metal like aluminum.

FIG. 9 shows an embodiment of a plate 10a made from a softer metal like aluminum. In this embodiment the sharp raised edges are made by pressing a rotating drill bit 85 through holes of smaller diameter in the plate 10a with enough pressure to push the metal into the sharp raised edges 20a around the perimeter of the aperatures on one side only. The larger drill bit is about 0.015 to 0.020 inches larger in diameter than the diameter of the original apertures.

Figure 13:
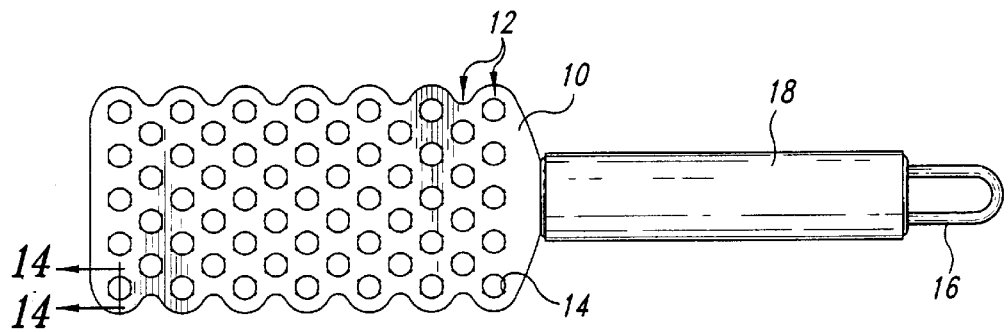
FIG. 13 is a plan view of another embodiment of the invention.
Figure 14:
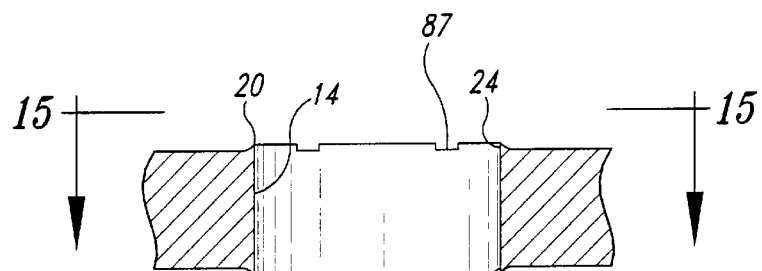
FIG. 14 is a section taken along the line 14—14 of FIG. 13.
Figure 15:
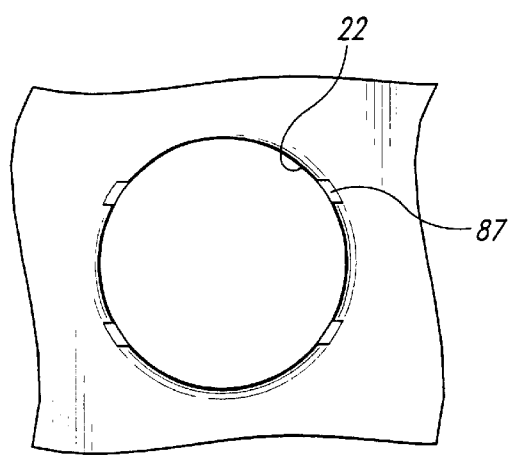
FIG. 15 is a fragmentary top plan view taken in the direction of the arrows 15—15 in FIG. 14.

FIG. 13 shows an embodiment like FIG. 1 but with the sharp raised edges notched as at 87. In this embodiment the flakes that are formed when grating are cut or shredded into smaller ribbons.

Figure 16:
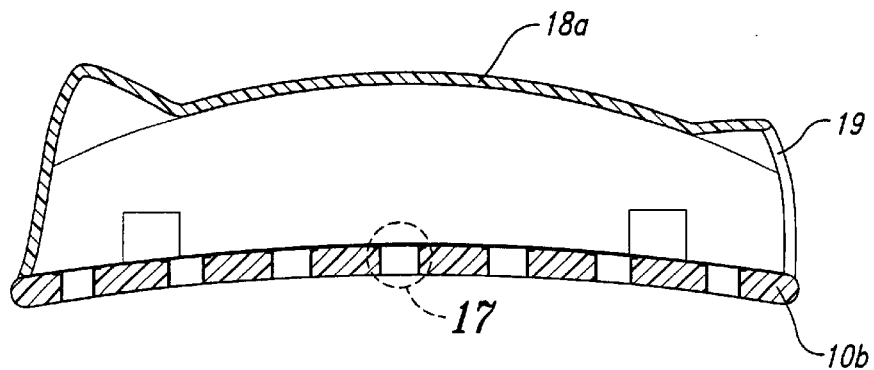
FIG. 16 is a longitudinal section of another embodiment of the invention.
Figure 17:
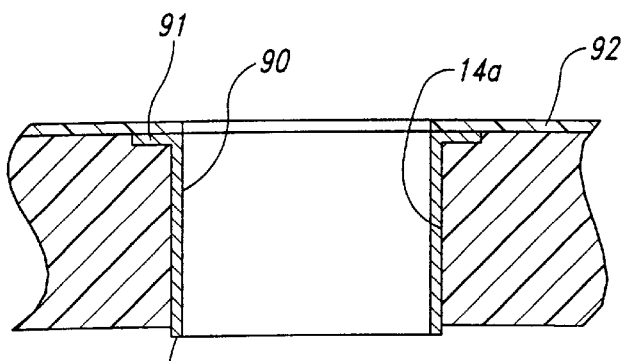
FIG. 17 is a fragmentary detail taken at the reference number 17 in FIG. 16.
Figure 18:
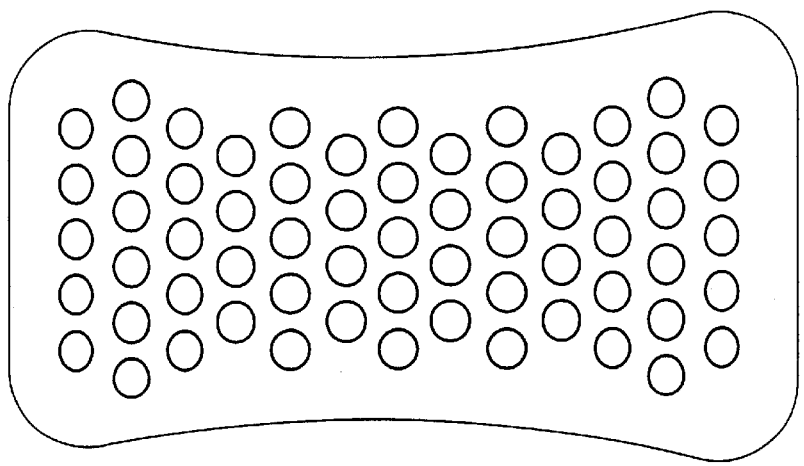
FIG. 18 is a bottom view of the grater shown in FIG. 16.

FIGS. 16–18 show another form of the invention in which the plate 10b is curved and made from plastic. The plate is mounted on a housing or handle 18a that can fit into the palm of the user's hand. The housing is hollow and has an open end 19 for the discharge of the comminuted food product. However, it should be understood that the curved plate could also be used with a straight handle as FIG. 1. In this form of the invention the apertures 14 are made by press-fitting metal, such as, stainless steel, inserts or rivets 90 into holes 14a. The rivets could also be made of other hard materials, such as, hard plastic. The rivets have an enlarged head 91 that rests against the inside surface of the plate 10b and are sealed into the holes by a second layer of plastic 92. The lower ends of the rivets extend outwardly beyond the lower surface of the plate by the same amount as for the other embodiments, namely, about no greater than 0.020 inches and preferably 0.001 inches. The inserts or rivets can be made with conventional rivet manufacturing techniques. This embodiment of the plate and the food shaving inserts is less expensive to manufacture than to form the raised edges directly in a single plate as in FIG. 1.

In all of the embodiments shown, the grate is produced by shaving against the inside edge of the outer substantially planar shaving end of the sharp raised edge 20 of the aperture. The inside wall of the aperture is substantially perpendicular to the shaving end of the raised edge as shown in FIGS. 3A, 4A, 5B, 14A, and 17 to produce a desired light airy flake grate from foods, such as pieces of cheese and chocolate. While the embodiments shown in some of the Figures show an aperture sidewall of a slight angle, as formed by the steps shown in FIGS. 7 and 8, this sidewall angle is so slight that the internal sidewall of the aperture is still substantially perpendicular to the outer substantially planar shaving end of the raised edge.

While specific embodiments of the invention have been illustrated and described, it should be apparent to one of ordinary skill in this art that the invention is not to be limited to the specific embodiments illustrated in the drawings. The embodiments have been described as made from metal, such as aluminum or stainless steel, preferably stainless steel; however, it is possible to mold the plate with sharp raised edges out of plastic, or to use metal, plastic or other materials inserts embedded in plastic as shown in FIG. 17 or embedded in other metal.

What is claimed is:

1. A grater for foods comprising;

a plate having opposite sides, a plurality of apertures in the plate and each aperture having an end with a perimeter and an internal sidewall, each aperture having a sharp raised edge extending outwardly from the side of the plate and terminating in an outer substantially planar shaving end around substantially the entire perimeter of the aperture, the aperture having an internal sidewall lying substantially perpendicular to the outer planar shaving end, the outer substantially planar shaving end extending no more than 0.020 inches out from the side of the plate, the outer substantially planar shaving end providing a shaving edge for grating the food.

2. The grater of claim 1, each aperture having a second opposite end with a perimeter, and an identical raised edge formed on each of the second opposite ends.

3. The grater of claim 1, said plate being flat, and including a handle attached to the plate for a person supporting the plate on an angle in use.

4. The grater of claim 1, said plate being curved around a center of curvature, and including means for rotating the plate about its center of curvature.

5. The grater of claim 1, said plate being flat and circular, and including means for moving the food around the circular plate.

6. The grater of claim 1, said apertures including inserts fitted into holes in the plate and the ends of the inserts extending outwardly beyond the side of the plate to form the outer substantially planar shaving end.

7. The grater of claim 6, the outer substantially planar shaving end extending out from the surface of the plate no more than 0.010 inches.

8. The grater of claim 1, the plate being slightly curved, a hollow housing attached to and supporting the plate, the housing having an opening for discharge of grated food product.

9. The grater of claim 1, the outer substantially planar shaving edge going completely around the entire perimeter of the end of the aperture.

10. The grater of claim 1, said apertures being square.

11. The grater of claim 1, said outer substantially planar shaving ends lying only on opposite diametrically opposed sides of the perimeter of the apertures.

12. The grater of claim 1, the outer substantially planar shaving ends extending out from the side of the plate no more than 0.010 inches.

13. A grater for foods, formed by the process of:

forming a plurality of staggered rows of apertures, each aperture having a perimeter, in a plate having opposite sides, pushing a member larger than the aperture in a first direction into each aperture to form a raised edge having an outer substantially planar shaving end around at least part of the perimeter of the raised edge of the aperture, the aperture having an internal sidewall lying substantially perpendicular to the outer substantially planar shaving end, the outer substantially planar shaving end extending out from the side of the plate no more than 0.020 inches and shaving the food when rubbed across the edges of the apertures in the plate.

14. The grater of claim 13, said member being tapered and having side cut-outs along its length.

15. The grater of claim 14, the tapered member being tapered only on two opposed sides.

16. The grater of claim 14, said cutouts being elongated cutting edges, said step of pushing the tapered member into the apertures including rotating the tapered member in the apertures.

17. The grater of claim 14, the plate being a flat plate, and further including forming an outer substantially planar shaving end on the opposite side of the plate by pushing a tapered member into each aperture from a second direction opposite to said first direction to form said raised edges with said outer substantially planar shaving ends on both sides of the plate.

18. The grater of claim 17, said plate being flat, and including a handle attached to the plate for a person supporting the plate on an angle in use.

19. The grater of claim 13, said plate being curved around a center of curvature, and including means for rotating the plate about its center of curvature.

20. The grater of claim 13, side plate being flat and circular, and including means for moving the food around the circular plate.

21. The grater of claim 13, the outer substantially planar shaving end extending out from the side of the plate no more than 0.010 inches.

22. The grater of claim 13, the apertures being non-circular.

23. The grater of claim 22, the non-circular apertures each being a square.

24. The grater of claim 13, the member being a drill bit.

* * * * *